Patented Jan. 30, 1951

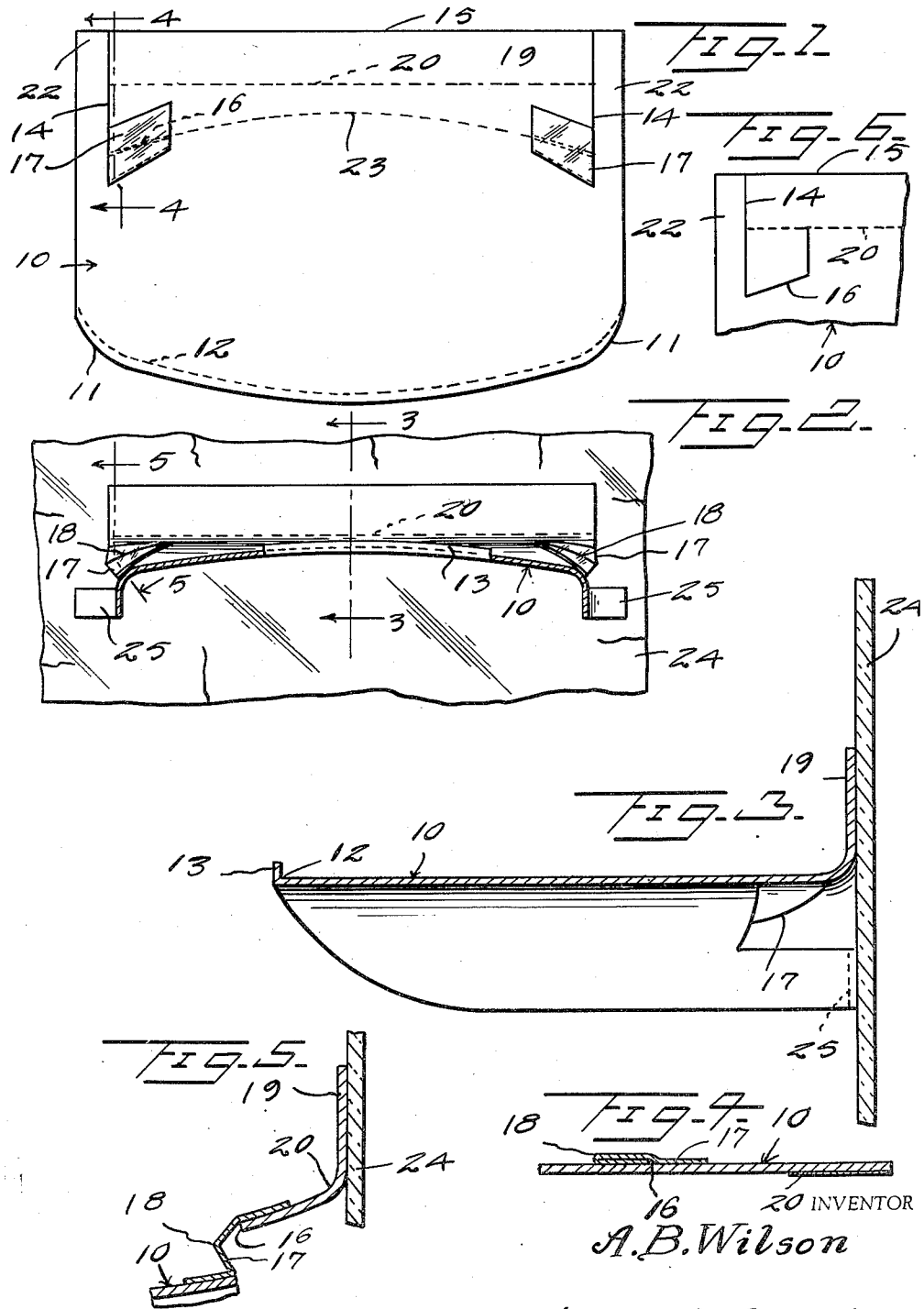

2,539,763

UNITED STATES PATENT OFFICE 2,539,763

GLARE AND RAIN SHIELD

Allen B. Wilson, Galena Park, Tex.

Application April 10, 1950, Serial No. 154,952

4 Claims. (Cl. 296—95)

This invention relates to a glare shield, and, more particularly, to such a shield adapted to be affixed to the windshield of a motor vehicle.

A primary object of the invention is the provision of a shield comprised of disposable material, which may be utilized one or more times, and then destroyed.

A further important object of the invention is to produce an inexpensive, easily attached, adjustable and disposable rain shield for use on automobiles at drive-in theatres which due to its inexpensiveness and disposability is also advantageous as a glare shield.

A further object of the invention is the provision of such a shield which may be attached to a windshield with a minimum of effort and difficulty.

Still another object of the invention is the provision of a device of this character provided with means whereby the same may be adjusted at any desired angle relative to the windshield, and including means preventing the seepage of water between cracks thereof at points adjacent the windshield.

A further object of the invention is the provision of a construction of this character which is sturdy and durable in construction, reliable and efficient in operation, and relatively simple and inexpensive to manufacture, assemble, and utilize.

Other objects will in part be obvious and in part be pointed out as the description of the invention proceeds and shown in the accompanying drawing, wherein there is shown a preferred embodiment of this inventive concept.

In the drawing:

Figure 1 is a plan view of one form of device embodying features of the instant invention shown in flat storage or shipping position prior to application thereof to a windshield.

Figure 2 is a front elevational view of the construction of Figure 1 shown in applied position on the windshield of a vehicle.

Figure 3 is an enlarged sectional view taken substantially along the line 3—3 of Figure 1 as viewed in the direction of the arrows.

Figure 4 is an enlarged sectional view taken substantially along the line 4—4 of Figure 1 as viewed in the direction indicated by the arrows.

Figure 5 is an enlarged sectional view taken substantially along the line 5—5 of Figure 2 as viewed in the direction indicated by the arrows, and Figure 6 is a fragmentary detail view of a portion of Figure 1 as viewed from the opposite side.

Similar reference characters refer to similar parts throughout the several views of the drawings.

Referring now to the drawings in detail, and more particularly, to Figure 1, the device of the instant invention is formed from a single unitary sheet generally indicated at 10, of cardboard or similar water repellent material, which may, if desired, be treated with a suitable water-proofing compound, such as shellac or wax. The blank 10 is formed at one edge with arcuate rounded corners 11, and provided adjacent that edge with a line 12 of indentations, by means of which a flange 13 may be formed adapted to be upwardly turned for a purpose to be more fully described hereinafter. The opposite edge of the device has a pair of parallel slits 14 extending from one straight edge 15 thereof inwardly a substantial distance toward the center of the sheet 10, which cuts intersect additional inwardly extending cuts 16 at an acute angle, the last mentioned cuts extending upwardly at an angle towards the edge 15. Cuts 16 are adapted to be covered by small sheets 17 of flexible material of water-proof nature, such as cellophane or the like which sheets are adapted to be pleated, as best shown at 18 in Figures 2 and 5. A portion 19 of the blank adjacent upper edge 15 between the cuts 14 is provided with a layer of adhesive material, of any desired width, and an arcuate line 20 of indentations similar to the line 12 extends transversely of the blank between the extremities of the cuts 16 to permit folding of portion 19 against the windshield.

In the application of the device the portion 19 of the blank between score line 20 and cuts 14 is bent upwardly, while the portions 22 of the blank outwardly of cuts 14 are bent downwardly along an arcuate line of indentations as best disclosed in Figure 2 to a position substantially perpendicular to the plane of sheet 10 and perpendicular to the windshield 24.

The adhesive on portion 19 is moistened and applied in horizontal position at a desired location on windshield 24, which serves to secure the portion 19 to the windshield securely. The edges of the shield including portions 22 are rolled downwardly with respect to the sheet 10 adjacent the outer extremities of cuts 16, and the extremities 25 of portions 22 folded outwardly and secured to the windshield by means of adhesive thereon, and the visor portion of the blank adjusted at a suitable angle, preferably substantially horizontal.

As the visor is bent outwardly to a desired angle and its edges rolled as described, it will be apparent that due to the arcuate configuration of score line 23, a gap will appear between the side portions of the visor and the edges of portion 19 along the slots 16. The pleated sheets 17 previously described will unfold and serve to close such gaps and preclude the passage of water gathered on the windshield between portions 22 and the visor 24.

The flange 13 is turned upwardly along the fold line 12, in such manner as to deflect water gathered on the visor to the sides thereof, and preclude the dripping of such water or moisture over the forward edge of the visor.

From the foregoing it will now be seen that there is herein provided a disposable glare or rain shield which accomplishes all the objects of this invention and others, including many advantages of great practical utility and commercial importance.

While the term "glare shields" is employed in the appended claims it is understood this is to be interpreted also as a rain shield.

As various embodiments may be made of this inventive concept and as various modifications may be made in the embodiment hereinbefore shown and described, it is to be understood that all matter herein is to be interpreted merely as illustrative, and not in a limiting sense.

What is claimed is:

1. A disposable glare shield comprised of a substantially rectangular sheet of water repellent material, having parallel slots therein extending from one edge to an intermediate point, said slots being relatively adjacent the opposite parallel edges of said sheet extending at right angles to said one edge, second slots extending inwardly of said sheet from the inner ends of said first mentioned slots, a score line extending between the inner ends of said second slots, and adhesive on an edge portion of said sheet adjacent said one edge whereby said portion may be secured to a vehicle windshield, the other portion of said sheet being bent along said score line to form a glare shield.

2. A disposable glare shield comprised of a substantially rectangular sheet of water repellent material, having parallel slots therein extending from one edge to an intermediate point, said slots being relatively adjacent the opposite parallel edges of said sheet extending at right angles to said one edge, second slots extending inwardly of said sheet from the inner ends of said first mentioned slots, a score line extending between the inner ends of said second slots, adhesive on an edge portion of said sheet adjacent said one edge whereby said portion may be secured to a vehicle windshield, the other portion of said sheet being bent along said score line to form a glare shield, and additional adhesive on the portions of said sheet between said first mentioned slots and said opposite parallel edges on the opposite side of said sheet from said first mentioned adhesive, whereby said last mentioned portions may be bent oppositely to said first portion secured to said windshield and the ends thereof secured to said windshield to support the portion thereof forming a glare shield.

3. A disposable glare shield comprised of a substantially rectangular sheet of water repellent material, having parallel slots therein extending from one edge to an intermediate point, said slots being relatively adjacent the opposite parallel edges of said sheet extending at right angles to said one edge, second slots extending inwardly of said sheet from the inner ends of said first mentioned slots, a score line extending between the inner ends of said second slot, adhesive on an edge portion of said sheet adjacent said one edge whereby said portion may be secured to a vehicle windshield, the other portion of said sheet being bent along said score line to form a glare shield, additional adhesive on the portions of said sheet between said first mentioned slots and said opposite parallel edges, whereby said last mentioned portions may be bent oppositely to said first portion secured to said windshield and the ends thereof secured to said windshield to support the portion thereof forming a glare shield, and a second score line adjacent the edge of said sheet opposite said one edge whereby the portion between said last mentioned edge and said last mentioned score line may be bent upwardly to form a water deflector.

4. A disposable glare shield comprised of a substantially rectangular sheet of water repellent material, having parallel slots therein extending from one edge to an intermediate point, said slots being relatively adjacent the opposite parallel edges of said sheet extending at right angles to said one edge, second slots extending inwardly of said sheet from the inner ends of said first mentioned slots, a score line extending between the inner ends of said second slots, adhesive on an edge portion of said sheet adjacent said one edge whereby said portion may be secured to a vehicle windshield, the other portion of said sheet being bent along said score line to form a glare shield, additional adhesive on the portions of said sheet between said first mentioned slots and said opposite parallel edges, whereby said last mentioned portions may be bent oppositely to said first portion secured to said windshield and the ends thereof secured to said windshield to support the portion thereof forming a glare shield, and flexible, foldable pleated water repellent material secured to said sheet over said second slots to seal the same against passage of water therethrough when said glare shield is positioned on a windshield.

ALLEN B. WILSON.

REFERENCES CITED

The following references are of record in the file of this patent:

UNITED STATES PATENTS

| Number | Name | Date |
| --- | --- | --- |
| 1,478,279 | Henne | Dec. 18, 1923 |
| 2,338,199 | Parke | Jan. 4, 1944 |